F. C. SHEARER.
MOLDING APPARATUS.
APPLICATION FILED OCT. 29, 1915.

1,198,159.

Patented Sept. 12, 1916.
3 SHEETS—SHEET 1.

Inventor
F. C. Shearer.

Witnesses

By

Attorney

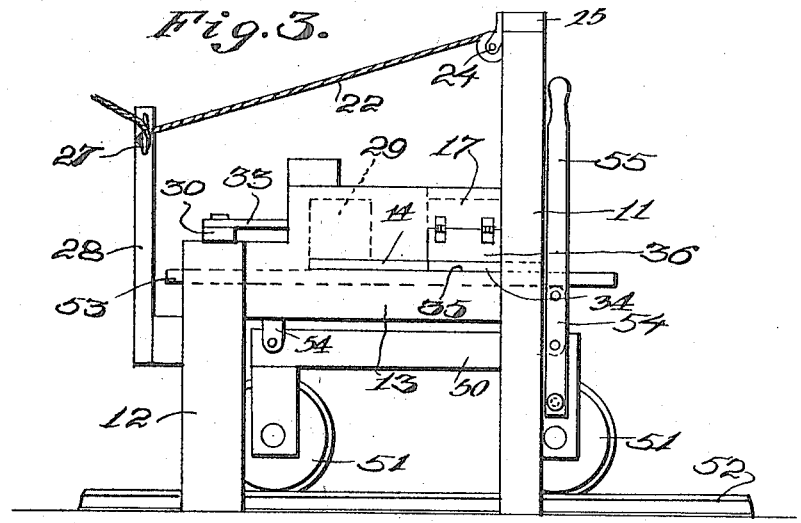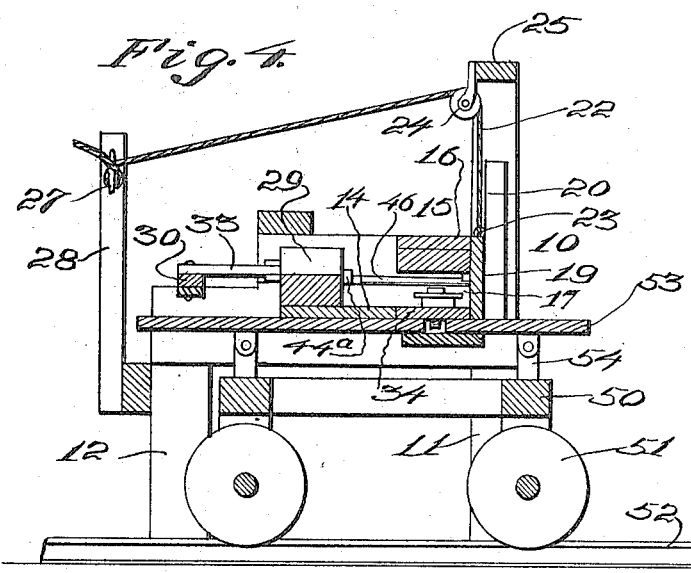

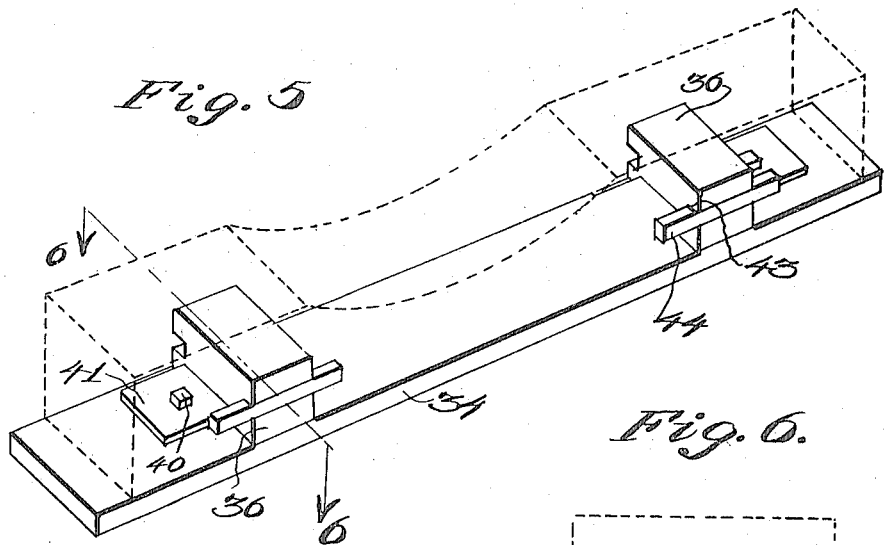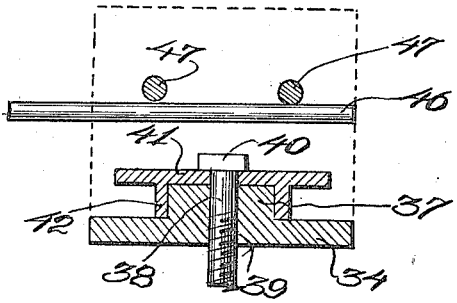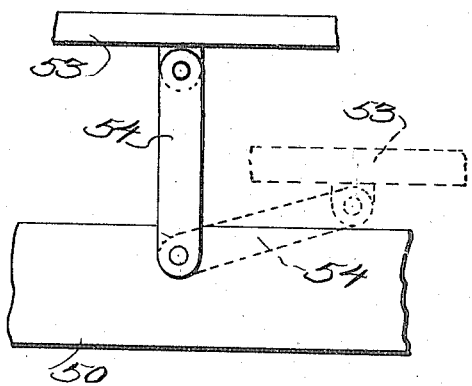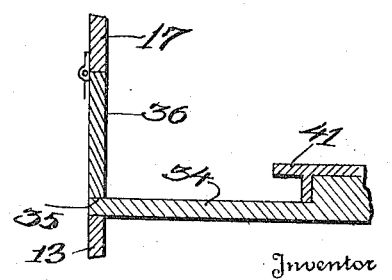

UNITED STATES PATENT OFFICE.

FREDERICK C. SHEARER, OF EAGLE PASS, TEXAS.

MOLDING APPARATUS.

1,198,159.  Specification of Letters Patent.  Patented Sept. 12, 1916.

Application filed October 29, 1915. Serial No. 58,603.

*To all whom it may concern:*

Be it known that I, FREDERICK C. SHEARER, a citizen of the United States, residing at Eagle Pass, in the county of Maverick and State of Texas, have invented certain new and useful Improvements in Molding Apparatus; and I do hereby declare the following to be a full, clear, and exact description of the invention, such as will enable others skilled in the art to which it appertains to make and use the same.

This invention relates to molding apparatus and more particularly to a novel and efficient means for molding or casting railway ties.

The invention has for its primary object to provide an improved molding apparatus embodying novel features of construction tending to increase the efficiency of the mold and increase the speed of operation thereof.

Figure 1:
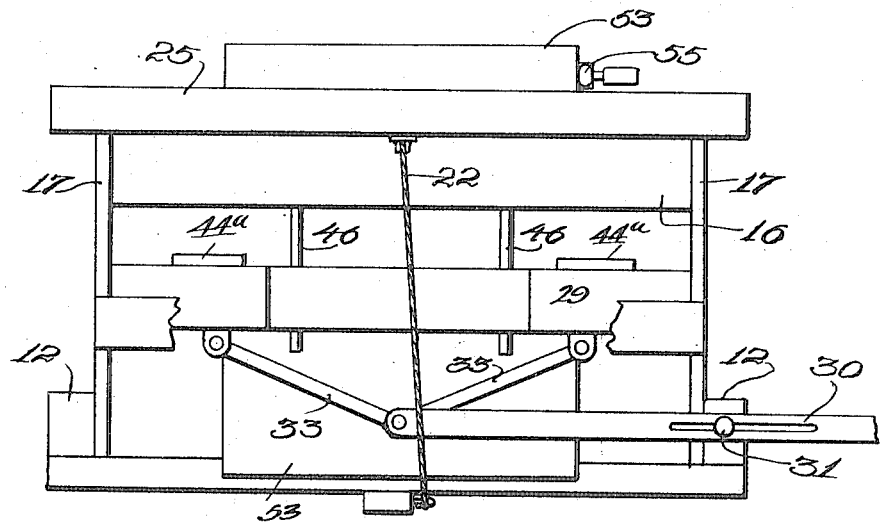
Figure 2:
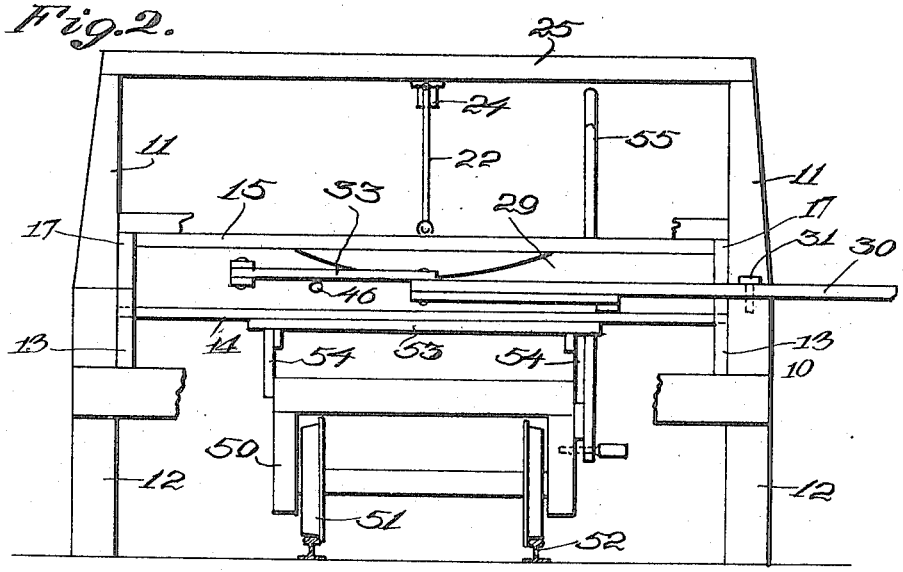
Figure 2:

With this and other objects in view, the invention consists in the novel construction, arrangement and formation of parts as will be hereinafter specifically described, claimed and illustrated in the accompanying drawings, in which:

Figure 1 represents a plan view of the molding apparatus, Fig. 2 represents an end elevation thereof, Fig. 3 represents a side elevation of the molding apparatus, Fig. 4 represents a longitudinal sectional view therethrough, Fig. 5 represents a perspective view of the removable bottom of the mold removed, Fig. 6 represents a detail sectional view on the line 6—6 of Fig. 5, Fig. 7 represents a fragmental detail view of the car or conveyer for the detachable bottom of the mold. Fig. 8 represents a fragmental longitudinal sectional view through the mold.

Referring to the drawings in detail, wherein similar reference numerals designate corresponding parts throughout the several views, the numeral 10 indicates generally the relatively stationary supporting frame for the stationary part of the mold and which includes pairs of relatively tall and short uprights, 11 and 12, respectively, arranged in spaced relation and connected by the horizontal members 13 in which is supported a table 14.

The end walls of the relatively stationary part of the mold designated generally by the numeral 15 are formed by the upper portions 17 of the horizontal members 13 upon which is secured the mold top 16. The central portion of the top 16 is formed with an enlargement 16$^a$ designed to form a recess in the central portion of the tie. The front wall 19 of the mold is slidable vertically in the guides 20 and is adapted to be elevated to open the front of the mold by a flexible element or cable 22 secured at 23 centrally of the upper longitudinal edge of the front wall 19, extending over a pulley 24 secured to the connecting member 25 connecting the upper extremities of the relatively tall uprights 11 and adjustably secured at its free end to a pin 27 secured to a post 28 carried by the relatively stationary frame structure 10.

The end walls 17 of the mold are extended a distance rearwardly of the top wall 16, as clearly illustrated in Fig. 4, and to provide guides for the horizontally reciprocable plunger 29 slidably supported upon the table 14, and adapted to be moved to operative position with relation to the relatively stationary part of the mold to provide a rear wall therefor by a hand lever 30, pivotally secured at 31 to the relatively stationary frame structure 10 and connected with the plunger 29 by a pair of links 33.

The bottom 34 of the mold is removably positioned between the end walls 17 and is adapted to be inserted in position therein through an aperture 35 formed in one end wall 17 and adapted to be closed by a hinged door 36. The bottom 34 is adapted to be removed forwardly from the relatively stationary part of the mold 15 when the slidable front wall 19 thereof is elevated, as will hereinafter appear. The bottom 34 is provided with a pair of spaced transversely disposed cores 36 adapted to form recesses or seats in the ties to accommodate wood or other cushioning devices for supporting the railroad tracks. Lugs 37 are formed integral with the bottom 34 outwardly of the cores 36 and are formed with apertures 38 of adequate size to slidably receive bolts 39, the heads 40 of which latter are engaged with anchoring plates 41 having angular flanges 42 spaced inwardly of the marginal edges of the plates 41 and adapted to terminate flush with the top face of the tie, which latter is cast or molded in inverted position. The forward ends of the cores 42 are formed with recesses 43, removably receiving clamping plates 44, which latter are to be embedded or anchored in one side of the finished tie. The forward surface of the plunger 29 is formed with forwardly directed lugs 44ᵃ adapted to form recesses upon opposite sides of each cushion-receiving seat in the tie for the reception of a second clamping bar (not shown) adapted to coöperate with the clamping bar 44 to clamp the wood or other cushioning elements in operative position in the tie.

A pair of supporting rods 46 are slidably mounted in the plunger 29, project into the mold 15 and are adapted to support reinforcing bars 47, Fig. 6.

A wheeled conveyer or car consisting of a body 50 supported upon wheels 51 is adapted to travel upon a track 52 extending between the uprights 11 and 12 of the pairs. The top 53 of the car 50 is supported upon a plurality of links 54 pivotally secured at their upper ends to the under surface of the top 53 and at their lower ends to the body 50. The upper end of one of the links 54 is extended to provide an operating lever 55, whereby the top 53 may be raised and lowered, as desired.

In the operation of the molding apparatus, the car 50 is moved to the approximate position illustrated in Figs. 3 and 4 and the top 53 is elevated, by swinging the lever 55 to vertical position, thus disposing the top 53 in position to support the bottom 34, which latter is inserted through the opening 35 in the end wall 17 and the closure or door 36 therefor is subsequently closed. Prior to inserting the bottom 34 of the mold the anchoring plates 41 are placed in position upon the lugs 37 and the bolts 39 are inserted in the apertures 38, as clearly illustrated in Figs. 5 and 6. The front wall 19 is then lowered, or closed, as illustrated in Fig. 4, and the plunger 29 is moved rearwardly in spaced relation to the rear edge of the top wall 16 to the position illustrated in Fig. 4. The plastic material is introduced through the space between the plunger 29 and the top wall 16 and during the process of packing or tamping the plastic material by operation of the plunger 29 the reinforcing rods 47 are placed in position upon the slide rods 46 and the clamping plates 44 for the tie are also placed in position. After the plastic material has been thoroughly packed, the plunger 29 is moved into proper position behind the top 16 to provide a rear wall for the mold. Subsequent to casting the tie, the front wall 19 is elevated by means of the cable 22, thus opening the front of the mold and permitting the bottom 34 and tie supported thereon to be removed forwardly from the mold upon the top 53 of the car 50 as the latter is moved along the track 52.

What I claim is:

1. In a molding apparatus, a mold including relatively stationary top and end walls, one of said end walls having an opening therein, a door hinged in said opening, a vertically slidable front wall, a reciprocable plunger constituting the rear wall, and a bottom movable longitudinally through said opening and removable laterally from the front of the mold when the front wall is elevated.

2. In a molding apparatus, a mold including relatively stationary top and end walls, a vertically slidable front wall, a horizontally reciprocable plunger constituting the rear wall, a bottom, and a traveling support for said bottom including a wheel mounted frame and a horizontally adjustable top carried thereby.

3. In a molding apparatus, a mold including a relatively stationary top and end walls, a vertically slidable front wall, a horizontally reciprocable plunger constituting the rear wall, means for elevating the front wall, one end wall having an opening therein, a closure for said opening, and a bottom slidable longitudinally through said opening and removable laterally from the front of the mold when the front wall thereof is elevated.

4. In a molding apparatus, a frame, a mold including relatively stationary top and end walls supported upon said frame, a vertically movable front wall slidably mounted in said frame, a table supported in said frame rearwardly of the front wall, a plunger reciprocably mounted upon said table, a bottom removably supported in said frame, a lever pivotally supported in said frame, and link connections between said lever and said plunger.

5. In a molding apparatus, a mold including relatively stationary top and end walls, a vertically movable front wall, a horizontally reciprocable plunger constituting the rear wall, a bottom removable laterally and longitudinally from said mold, and means for supporting said bottom including a wheel mounted frame, a top, pivotal connections between said top and said frame, and a lever for adjusting said top vertically.

6. In a molding apparatus, relatively stationary top and end walls, a vertically movable front wall, a reciprocable plunger constituting the rear wall, and a bottom including spaced transversely disposed cores, and apertured lugs arranged upon opposite sides of each core.

In testimony whereof I affix my signature in presence of two witnesses.

FREDERICK C. SHEARER.

Witnesses:
FLORENCE B. GROVE,
THOS. H. MOSS.

Copies of this patent may be obtained for five cents each, by addressing the "Commissioner of Patents, Washington, D. C."